Jan. 9, 1951        P. BEST        2,537,002
BRAKE BEAM SUPPORT
Filed Oct. 11, 1948        2 Sheets-Sheet 2
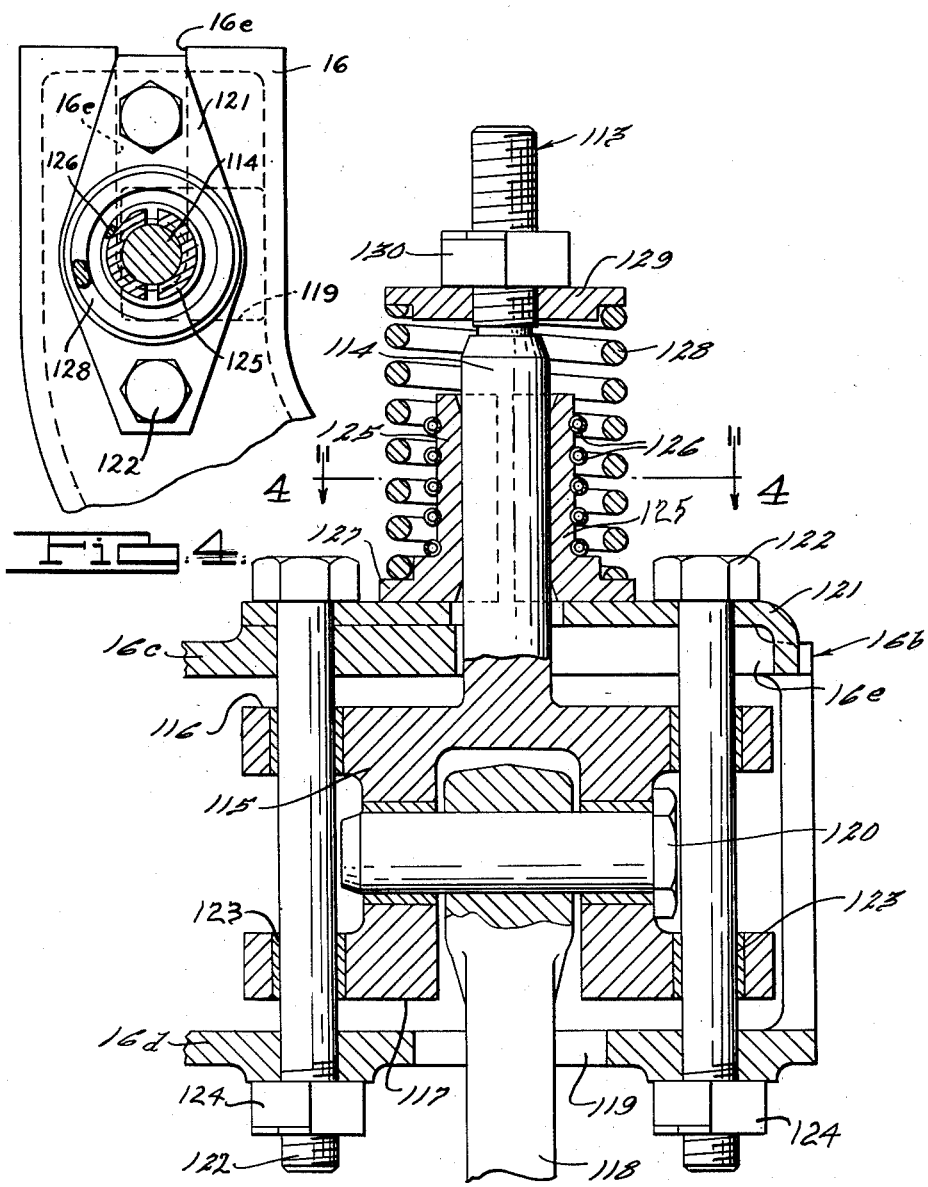
INVENTOR.
Percy Best
BY
Harness and Harris
ATTORNEYS.

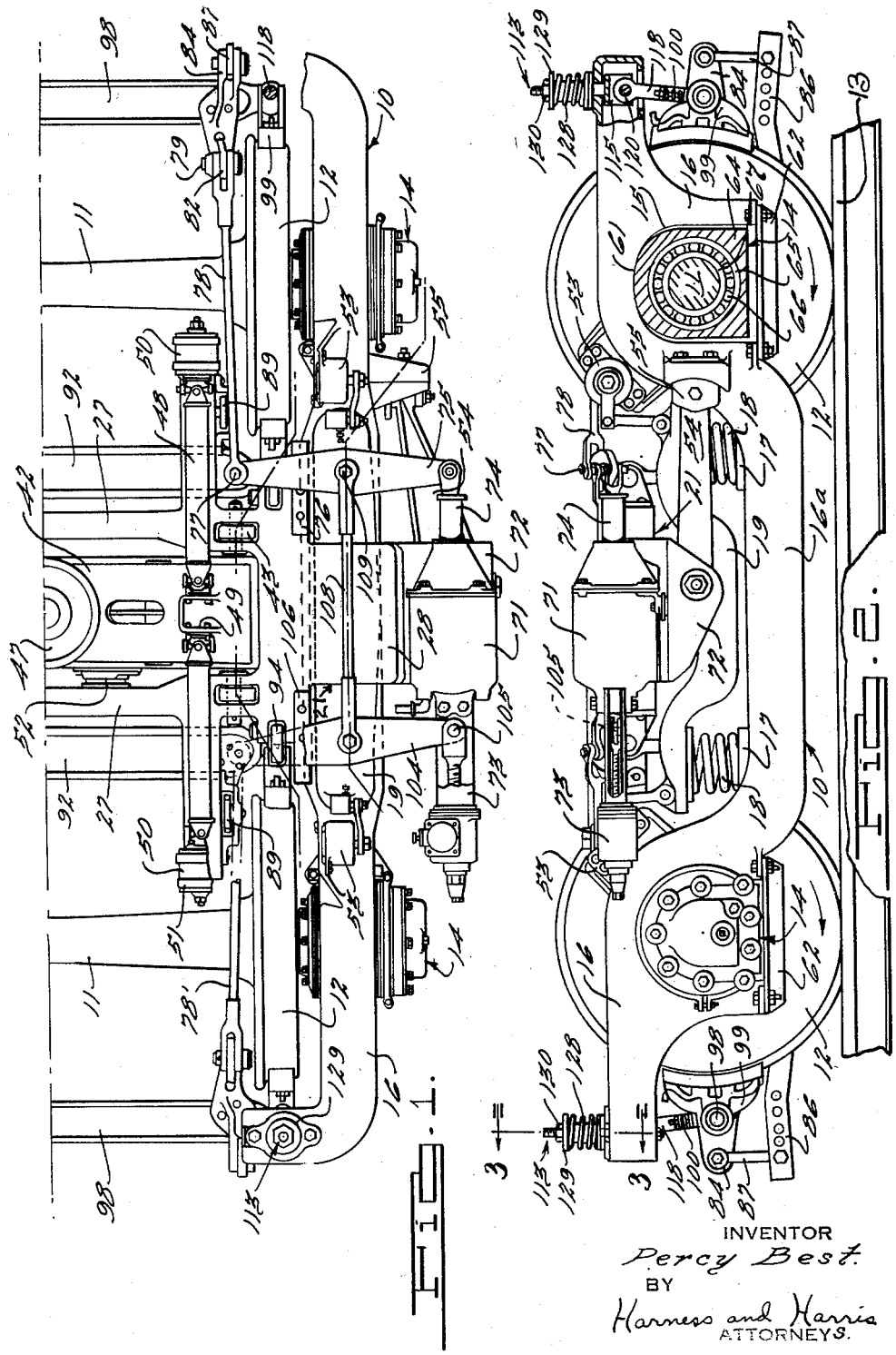

Patented Jan. 9, 1951

2,537,002

UNITED STATES PATENT OFFICE 2,537,002

BRAKE BEAM SUPPORT

Percy Best, Detroit, Mich., assignor to Chrysler Corporation, Highland Park, Mich., a corporation of Delaware Application October 11, 1948, Serial No. 53,919

19 Claims. (Cl. 188—207)

This invention relates to railway car trucks and has particular reference to a simplified and improved means for mounting the brake rigging on the truck unit in such a manner that wear of the rigging components is materially reduced. This reduction in wear of the rigging components is accomplished by resiliently suspending the rigging on the truck frame members such that the road shock applied to the frame member is effectively absorbed by the suspension without being transmitted to the rigging.

Railroad maintenance records show conclusively that one of the most frequent causes of lay-up of railway cars for repairs is wear and damage in the brake rigging. The fact that the brake beam hanger links may be fixedly supported on unsprung frame members has been found to be one of the primary causes for the maintenance difficulties associated with the brake rigging.

It is a primary object of this invention to mount the brake rigging on the truck frame in such a manner that, under normal running conditions with the brakes released the brake beams are suspended from unsprung frame members by resilient means which effectively absorb the road shock transmitted through the frame members to the rigging, the suspension arrangement being such that on application of the brakes the brake beams are automatically anchored to unsprung frame members, which provide unyielding, positive, supports to take the brake reaction.

It is an additional object of this invention to provide an improved brake rigging including resilient brake beam supports and means adapted to effectively damp out vibration of the resiliently supported beams.

It is a further object of this invention to provide positive guide means for the resiliently supported brake beams whereby canting or tilting of the resilient supporting means is prevented.

The nature of this invention as well as additional objects and advantages thereof will become fully apparent from a reading of the following description and a consideration of the related drawings wherein:

Fig. 1 is a half plan view of a railway truck embodying this invention;

Fig. 2 is a side elevation of the railway truck shown in Fig. 1 with portions of the truck frame broken away to clearly disclose the invention;

Fig. 3 is an enlarged sectional elevation of the brake beam hanger link suspension taken along the line 3—3 of Fig. 1.

Fig. 4 is a top plan elevation of the hanger suspension shown in Fig. 3, this view being to a somewhat reduced scale to conserve space.

The railway car truck 10 comprises longitudinally extending, transversely spaced, side frame members 16 mounted on a pair of longitudinally spaced, transversely extending, axles 11. Each axle 11 carries a pair of wheels 12 which engage the conventional track rails 13. The protruding ends of each axle 11 are journaled in wheel axle bearing assemblies 14 one of which is clearly shown in Fig. 2 and is subsequently described in detail. The bearing assemblies 14 are mounted in the inverted U-shaped journal openings 15 (see Fig. 2) in the ends of the side frame members 16. The mounting of the bearing assemblies 14 in the side frame journal openings 15 is such as to provide an unsprung, "pedestalless" type of connection wherein the axles and bearing assemblies are solidly connected to the side frame members and are precluded from vertical movement with respect to the side frame members. The type of bearing assembly shown is similar to that covered by the U. S. patent to Janeway et al. 2,335,120.

Each of the side frames 16 has a depressed middle section 16a provided with longitudinally spaced seats 17 on which are mounted nested coil springs 18 through which the truck load is resiliently applied to the side frame members. The springs 18 in turn support the end portions of the longitudinally extending beam members 19 which also form a part of the load supporting system. Beams 19 mount spring units (not shown) which are arranged so as to resiliently support another load carrying structure, namely, the transom frame 21. This transom frame 21 comprises longitudinally spaced members 27 extending transversely of the truck, which members are joined at their ends by connecting sections 28.

Thrust links 48, having their inner ends secured to a bracket 49 carried by the bolster 42 and their outer ends anchored to brackets 50 carried by the transom frame 21, restrict longitudinal movement of the bolster relative to the transom frame. Universal joints connect the thrust links 48 to their supporting brackets 49 and 50. Each link 48 includes a resilient draft member 51 which permits the links 48 to take up the longitudinal thrust between the bolster 42 and the transom frame 21. Shock absorber units 52 restrain relative transverse or lateral movement between the bolster and transom frame.

Relative movement between the side frame members 16 and the beam members 19 is controlled by the shock absorber units 53 mounted therebetween. Along the outboard side of each side frame 16 there is positioned a longitudinally extending stabilizing member 54, having one of its ends pivotally connected to the bracket 72 carried by the transom frame 21 and its other end pivotally connected to a bracket 55 carried by the side frame 16 to restrain relative longitudinal and transverse movement between the side frame members and the transom frame.

The central portion of the truck bolster 42 is formed with a conventional bearing member 47 which receives a complementary bearing portion carried by the body unit to be mounted on the truck unit. The bearing connections between the body unit and the truck bolsters permit relative turning movement between the car body unit and the supporting truck units.

The manner of solidly mounting the side frames 16 on the axle supported wheel bearing assemblies 14, is shown in Fig. 2. Each side frame end portion is provided with a U-shaped journal opening 15 to receive the wheel axle bearing assemblies 14. Each journal opening 15 is formed with a bearing seat 61 in the curved bight portion of its U-shaped wall. The seat portion 61 receives a rigid bearing assembly 14 carried by the wheel axle 11. Tie members 62 extend across the open mouth of the U-shaped opening 15 to retain the bearing assembly 14 within the opening 15. Each journal bearing assembly 14 comprises an outer housing 64 within which are concentrically mounted an outer roller bearing race 65, a set of tapered roller bearings 66, and an inner roller bearing race 67, the latter being secured to and rotatable with the wheel axle 11. Housing 64 is adapted to contain oil or some other liquid lubricant so that the rollers 66 of the bearing assembly are constantly supplied with lubricant.

The wheel brake mechanism is best illustrated in Figs. 1 and 4 and comprises an air cylinder 71 disposed on each side of the truck unit. Cylinders 71 are mounted on laterally extending brackets 72 protruding from the transom frame connecting sections 28. Connected to one end of each air cylinder 71 is a longitudinally extending brake rigging slack adjusting mechanism 73. Extending from the opposite end of each air cylinder 71 is a piston actuated connecting rod 74 adapted to operate the brake linkage associated therewith. Pivotally connected to the exposed end of rod 74 is a horizontally disposed, transversely extending, lever 75. Lever 75 is slidably supported adjacent its inner end by the bearing block 76 carried by the outer side of the transom member 21. The inwardly disposed end of lever 75 is pivotally connected at 77 to the longitudinally extending, connecting rod 78. Rod 78 is pivotally connected at 79 to the vertically disposed lever 82. Lever 82 is pivotally connected intermediate its ends, as at 83, to the inwardly disposed end of the longitudinally extending, bracket member 84. Bracket 84 is rigidly mounted on the resiliently supported, transversely extending, brake beam 98.

The resilient suspension for brake beam 98 will be subsequently described in detail. Brake beam 98 carries on its outer end portions the brake shoes 99 which are adapted to be rocked into braking engagement with the rolling surfaces of the adjacent truck wheels. Shoes 99 are pivotally mounted on the ends of the brake beam 98 so as to permit relative rotatable movement of the shoes in vertically extending planes. However, the freedom of rotation of the shoes 99 relative to the beam 98 is restrained by the spring-loaded bearing members 109 which tend to retain the shoes in fixed positions relative to the beam 98. The spring-loaded bearing members 100 prevent the shoes 99 from dragging on the truck wheels when the brakes are released and thus eliminate wear and chatter of the shoes.

The lever 82 is pivotally connected to an intermediate portion of the compensating and actuating link 86. The outer end of link 86 is connected by the pivoted link 87 to the outer end of the brake beam supported lever 84. The connections between the several levers 82 and 84 and links 86 and 87 permit relative pivotal movement between these members and constitute a parallelogram linkage for control of the movement of the outer brake shoes 99. A plurality of bolt holes are located along the length of link 86 to permit adjustment of the brake linkage to compensate for wear, inaccuracies in manufacture, and the like. Brake beams 92 adjacent the inner sides of the truck wheels support inner brake shoes in a manner similar to that described with regard to the outer brake shoes 99.

The brake rigging on all wheels of the truck is identical and for that reason the rigging on only one wheel has been described. The wheel brake rigging that has just been described will be considered that for the truck front wheel for purposes of this discussion. To coordinate the rigging on the front and rear wheels along each side of the truck a horizontally disposed, transversely extending rear wheel brake lever 104, similar in design to lever 75 associated with the front wheel brakes, is pivotally connected to an adjustably mounted pivot pin 105 carried by the brake shoe slack adjusting mechanism 73. The inwardly disposed end portion of lever 104 is pivotally connected to the connecting rod 78' for the brake linkage associated with the rear wheel brakes. Lever 104 is slidably supported on a bearing block 106 carried by the transom 21, the block 106 being similar to the bearing block 76 for the lever 75 associated with the front wheel brakes. The intermediate portions of levers 75 and 104 are connected together by a longitudinally extending equalizing link 108 that coordinates the action of the front and rear wheel brake mechanisms.

As a result of the rigid mounting of the side frame members 16 on the wheel axles 11 it is obvious that road shock will be transmitted from the wheels 12 to the side frames 16 and thence to the supports for the brake rigging suspended from the unsprung side frames. Accordingly, if the brake rigging is not resiliently supported from the side frames in such a manner as to insulate the rigging from the shocks applied to the side frames, when the brakes are released, then the road shock transmitted to the rigging supports will cause accelerated wear of the bearings in the rigging which can result in a shearing off of the brake beams hanger pins. The wear resulting from road shock in a rigid construction accordingly materially reduces the life of the side frame supported brake rigging and is a constant source of possible trouble. Not only are the brakes rendered inoperative by such failures of the brake rigging but in addition the brake beam rigging may drop down on the rails and derail the truck units and their supported cars with a consequent loss of life and property.

To eliminate this possible source of trouble in the brake rigging, the side frame supported brake beams 98 are provided with resilient suspensions that effectively absorb all shock impacts that might be transmitted through the frames to the frame supported rigging. The suspension arrangement is such that a rigid support is automatically provided for the brake rigging when the brakes are applied but at all other times the brake rigging is resiliently insulated from the frame members. Each resilient shock absorbing suspension comprises a vertically disposed brake beam hanger support 113 that is loosely mounted within the box-like end portion 16b of the side frame member 16. Hanger support 113 includes a bolt portion 114 and a U-shaped yoke portion 115. Yoke portion 115 includes upper and lower bearing portions 116 and 117 one of which is adapted to engage one of the side frame wall portions 16c or 16d when the brakes are applied. Hanger support 113 is adapted to be inserted into the box-like end portion 16b of side frame member 16 through an opening 16e in the end wall of frame portion 16b. After mounting hanger support 113 in the end portion 16b of the side frame member, the upper end of the hanger link 118 is inserted through an opening 119 in the wall portion 16d of the side frame member and is pivotally connected to the yoke portion 115 of the support 113 by means of the pivot pin 120. The lower end of hanger 118 is pivotally connected to an end of the brake beam member 98 adapted to be supported thereby. The support 113 and hanger 118 are securely fastened to the side frame member 16 by means of a cover plate 121 and bolts 122. Cover plate 121 is seated on the top wall of the side frame with the bolt portion 114 of hanger support 113 extending through an opening in the cover plate. Bolts 122 extend through aligned openings in the cover plate 121 and the top wall 16c of the side frame member, through the bolt bores 123 in the yoke portion 115 of the support 113, and through openings in the bottom wall 16d of the side frame member. Nuts 124 are threaded on the bolts 122 to secure the bolts in place. The bolts 122 serve several additional purposes in addition to connecting the hanger link and its support to the side frame member. Bolts 122 are arranged such that they retain the hanger link pivot pin 120 in its assembled position and for that reason a separate means to fasten the pivot pin 120 in the yoke 115 of the hanger is eliminated. In addition bolts 122 extending through the bores 123 of the hanger link yoke portion 115 serve as a guide means to control the movement of the hanger support and restrict it to vertical reciprocation relative to the frame. As a result of the bolts 122 serving as guideways for the hanger support, the bolt portion 114 of the support 113 is prevented from tilting and the coil springs units 128, mounted about the bolt portion 114, are never subjected to a twisting or canting action. Furthermore, the bushings in the bolt bores 123 of the yoke portion of hanger support 113 slide along the bolts 122 during vertical reciprocation of the hanger link support and the frictional resistance of the contacting sliding surfaces tends to damp out the vibratory motion of the resiliently supported hanger link.

Mounted about the bolt portion 114 of hanger support 113, in concentric, embracing relationship, is a pair of semi-cylindrical, shell-like friction shoes 125. Shoes 125 are held in frictional engagement with the bolt portion 114 of hanger support 113 by a plurality of garter springs 126 seated in annular grooves in the sides of the friction shoes 125. Springs 126 are tensioned during assembly of the friction shoes on the bolt 114 so that they constantly exert a predetermined compressive force against the friction shoes 125. The garter springs 126 in combination with the friction shoes 125 constitute the primary friction means for damping out the vibrations of the resiliently supported brake beam assembly. The bushings in the bolt bores 123, sliding on the bolts 122, may be considered the secondary friction damping means.

Friction shoes 125 are formed with outwardly extending flanges 127 at their lower end portions which flanges serve as seats for the bottom convolution of the coil spring 128 mounted thereon. Spring 128 is adapted to resiliently support the hanger support 113. Spring 128 extends between the flanges 127 of the friction shoes 125 and a plate washer 129 fastened on the upper end of the hanger link bolt portion 114 by the nut 130. Spring 128 not only resiliently supports the hanger support 113, the hanger link 118 and the brake beam 98, but in addition it retains the friction shoes in place on the cover plate 121 and restrains vertical movement of the shoes relative to the hanger support bolt 114 as the hanger support vibrates on the supporting spring 128.

The nut 130 threaded on the exposed upper end of the hanger support bolt portion 114 provides a means for adjusting the coil spring 128. The frictional engagement between the friction shoes 125 and the bolt portion 114 may be adjusted by merely adding or removing one or more of the garter springs 126.

This resiliently supported brake beam suspension operates as follows:

Under normal running conditions with the brakes released the coil springs 128 hold the brake beam hanger supports 113 in raised positions such that the yoke bearing portions 116 and 117 are out of contact with the adjacent portions 16c and 16d of the side frame members. The length of the yoke portions 115 of the supports 113 is such that sufficient jounce space is provided between the portions 16c and 16d to absorb all shock applied to the side frame members without the portions 116 and 117 contacting the upper or lower wall portions 16c and 16d of the side frame members. By this arrangement, under normal running conditions with the brakes released, the brake beam hanger supports 113 are completely free of the side frame members and thus are not subjected to any wear resulting from road shock. When the brakes are applied the brake reaction between the truck wheels and the brake shoes is transmitted to the brake beam hanger supports 113 and these supports are forced either upwardly or downwardly, depending on the direction of rotation of the wheels, until one of the bearing portions 116 or 117 bears against one of the walls 16c or 16d of the side frame members so as to provide a firm, rigid support for the brake rigging.

It will be noted that the brake rigging arrangement herein disclosed provides a resiliently mounted suspension for the brake beams during normal running with the brakes released. However, when the brakes are applied the resilient suspension for the brake beams is automatically converted into a non-resilient, solidly supported, brake rigging arrangement that provides a positive braking action.

Brake rigging supported entirely on resilient suspensions soft enough to absorb road shock does not have sufficient rigidity to withstand the brake reaction consequently it does not provide a satisfactory braking action. Brake rigging that is permanently mounted on solid supports is subjected to road shock and consequently accelerated wear and a short life. By the arrangement herein disclosed the desirable features of the resiliently suspended and the solidly supported brake rigging systems have been combined into a single arrangement that is free of the disadvantages of each of the aforementioned systems. In addition the vibratory motion of the brake beams resiliently supported from the side frames is effectively damped by the spring pressed friction shoes and by the frictional engagement of the mounting bolts in the bolt bores of the hanger support yoke portions. Also, the life of the coil spring supporting springs is materially extended by the guide bolt arrangement which restricts the hanger supports to vertical movement and prevents tilting or canting of the hanger supports and their supporting springs.

I claim:

1. In a railway truck brake rigging, a frame member, a brake beam suspension carried by said frame member comprising a hanger support resiliently mounted on said frame member, vibration damping means engaging said hanger support, means slidably connecting said hanger support to said frame member providing guide means for the movement of said hanger support relative to said frame member, means associated with said hanger support adapted to rigidly anchor said hanger support to said frame member, and a hanger link pivotally connected to said hanger support adapted to have a portion thereof connected to a brake beam.

2. In a railway truck brake rigging, an unsprung frame member, a brake beam suspension carried by said frame member comprising a hanger support movably mounted on said frame member, resilient means supporting said hanger support on said frame member, spring-loaded vibration damping means carried by said frame member engaging said hanger support, bolt means slidably connecting said hanger support to said frame member providing guide means for the movement of said hanger support relative to said frame member, means carried by said hanger support engageable with said frame member to rigidly support said hanger support on said frame member, and a hanger link pivotally connected to said hanger support adapted to have a portion thereof connected to a brake beam.

3. In a railway truck brake rigging, a frame member, a brake beam suspension carried by said frame member comprising a hanger support movably mounted on said frame member, resilient means supporting said hanger support on said frame member, vibration damping means engaging said hanger support, bolt means slidably connecting said hanger support to said frame member providing guide means for the movement of said hanger support relative to said frame member, means carried by said hanger support adapted to be engaged with said frame member to rigidly support said hanger support, and a hanger link pivotally connected to said hanger member by a pivot pin, said bolt means being arranged to anchor said pivot pin in assembled position.

4. In a railway truck, a frame member having a vertically disposed opening extending therethrough, a hanger support movably mounted in said frame opening, said hanger support including a downwardly directed, U-shaped, yoke portion disposed within said frame opening and an upwardly directed bolt portion extending from said frame opening, a cover plate having an opening therein mounted on said frame member with the bolt portion of said hanger support extending through the opening in said cover plate, a hanger link having an end portion thereof positioned between the leg portions of said U-shaped yoke portion, a pin extending through the legs of said yoke portion and through the end portion of said hanger link to pivotally connect the hanger link to the hanger support, bolts extending through said cover plate, frame member and the yoke portion of said hanger support to slidably connect said hanger support to said frame member, said bolts constituting guide means for said movably mounted hanger support and being arranged to serve as retaining means for said pivot pin, shell-like friction shoes mounted on said frame member with portions thereof embracing the side surfaces of said bolt portion, a garter spring tensioned around said friction shoes to hold said shoes in engagement with said bolt portion, a plate member carried by said bolt portion and spaced from said frame member, and a coil spring surrounding said bolt portion and extending between said plate member and said friction shoes to resiliently support said hanger support on said frame member.

5. In a railway truck, a frame member having a vertically disposed opening extending therethrough, a hanger support movably mounted in said frame opening, said hanger support including a downwardly directed, U-shaped, yoke portion disposed within said frame opening and an upwardly directed bolt portion extending from said frame opening, a cover plate having an opening therein mounted on said frame member with the bolt portion of said hanger support extending through the opening in said cover plate, a hanger link having an end portion thereof positioned between the leg portions of said U-shaped yoke portion, a pin extending through the legs of said yoke portion and through the end portion of said hanger link to pivotally connect the hanger link to the hanger support, bolts extending through said cover plate, frame member and the yoke portion of said hanger support to slidably connect said hanger support to said frame member, said bolts constituting guide means for said movably mounted hanger support and being arranged to serve as retaining means for said pivot pin, shell-like friction shoes mounted on said frame member with portions thereof embracing the side surfaces of said bolt portion, a garter spring tensioned around said friction shoes to hold said shoes in engagement with said bolt portion, a plate member carried by said bolt portion and spaced from said frame member, and a coil spring surrounding said bolt portion and extending between said plate member and said friction shoes to resiliently support said hanger support on said frame member, said hanger support including bearing portions adapted to be moved into engagement with said frame member to rigidly support said hanger support on said frame member.

6. In a railway truck, a frame member having a vertically disposed opening extending therethrough, a hanger support movably mounted in said frame opening slot, said hanger support including a yoke portion disposed within said frame opening and a bolt portion extending from said frame opening, a cover plate having an opening therein mounted on said frame member with the bolt portion of said hanger support extending through the opening in said cover plate, a hanger link having an end portion thereof positioned between the leg portions of said yoke portion, a pin extending through the legs of said yoke portion and through the end portion of said hanger link to pivotally connect the hanger link and hanger support, bolts extending through said cover plate, frame member and the yoke portion of said hanger support to slidably connect said hanger support to said frame member, said bolts providing guide means for said movably mounted hanger member, vibration damping friction shoes mounted on said frame member with portions thereof embracing the side surfaces of said bolt portion, means associated with said friction shoes to hold said shoes in engagement with said bolt portion, a radially extending projection carried by said bolt portion, spaced from said frame member, and a coil spring surrounding said bolt portion and extending between said projection and said frame member to resiliently support said hanger support on said frame member.

7. In a railway truck, a frame member having a vertically disposed opening extending therethrough, a hanger support movably mounted in said frame opening, said hanger support including a yoke portion disposed within said frame opening and a bolt portion extending from said frame opening, a cover plate having an opening therein mounted on said frame member with the bolt portion of said hanger support extending through the opening in said cover plate, a hanger link having an end portion thereof positioned between the leg portions of said yoke portion, a pin extending through the legs of said yoke portion and through the end portion of said hanger link to pivotally connect the hanger link and hanger support, bolts extending through said cover plate, frame member and the yoke portion of said hanger support to slidably connect said hanger support to said frame member, said bolts providing guide means for said movably mounted hanger member, vibration damping friction shoes mounted on said frame member with portions thereof embracing the side surfaces of said bolt portion, means associated with said friction shoes to hold said shoes in engagement with said bolt portion, a radially extending projection carried by said bolt portion, spaced from said frame member, and a coil spring surrounding said bolt portion and extending between said projection and said frame member to resiliently support said hanger support on said frame member, said hanger support including portions adapted to be engaged with said frame member to rigidly support the hanger support on the frame member.

8. In a brake beam suspension for a railway car truck, a truck frame provided with a vertically extending opening, a hanger support movably mounted in said opening including a vertically extending bolt portion disposed above said frame opening and a yoke portion disposed beneath said frame opening, a horizontally extending projection carried by the end of said bolt portion disposed above said frame opening, a resilient member disposed between the projection on said bolt member and the frame member, friction shoes embracing the bolt portion of the hanger support, resilient means urging said friction shoes into engagement with said bolt portion, a hanger link pivotally connected to the yoke portion of said hanger support, bolt means extending through said frame member and said yoke portion to slidably connect the suspension to the frame member and to provide guide means for the movement of said hanger support, and bearing portions on said hanger support engageable with said frame member after a predetermined movement of the hanger support to thereafter rigidly support the hanger support on the frame member.

9. In a brake beam suspension for a railway car truck comprising a truck frame member, a hanger support movably mounted in a vertically extending opening in said frame member, said hanger support including a bolt portion extending above said frame member opening and a pivot portion disposed beneath said frame member opening, friction shoes disposed about said bolt portion in embracing relationship thereto, resilient means retaining said shoes in frictional engagement with said bolt portion, means disposed between said frame member and the bolt portion of said hanger member to resiliently support said hanger support on said frame member, a pin pivotally connecting a hanger link to the pivot portion of said hanger support, vertically directed bolt bores extending through said pivot portion, bolts connected to said frame member through said bolt bores so as to slidably connect said hanger support to said frame member and provide guide means for the movement of said hanger support, and anchor portions on said hanger support adapted to be engaged with said frame member to rigidly support the hanger support on the frame member after predetermined vertical movement of said hanger support.

10. In a brake beam suspension for a railway car truck comprising a truck frame member, a hanger support movably mounted in a vertically extending opening in said frame member, said hanger support including a bolt portion extending above said frame member opening and a pivot portion disposed beneath said frame member opening, friction shoes disposed about said bolt portion in embracing relationship thereto, resilient means retaining said shoes in frictional engagement with said bolt portion, means disposed between said frame member and the bolt portion of said hanger member to resiliently support said hanger support on said frame member, a pin pivotally connecting a hanger link to the pivot portion of said hanger support, vertically directed bolt bores extending through said pivot portion, bolts connected to said frame member through said bolt bores so as to slidably connect said hanger support to said frame member and provide guide means for the movement of said hanger support, said bolts being arranged to retain said pivot pin in assembled position, and anchor portions on said hanger support adapted to be engaged with said frame member to rigidly support the hanger support on the frame member after predetermined vertical movement of said hanger support.

11. In a brake beam suspension for a railway car truck comprising a truck frame member, a hanger support mounted in a vertically extending opening in said frame member for vertical movement relative thereto, said hanger support including a bolt portion extending above said frame member opening and a yoke portion disposed beneath said frame member opening, a coil spring disposed between said frame member and the bolt portion of said hanger member to resiliently support said hanger support on said frame member, a pin pivotally connecting a hanger link member to the yoke portion of said hanger support, vertically directed bolt bores extending through said yoke portion, bolts connected to said frame member through said bolt bores so as to slidably mount said hanger support on said frame member and provide guide means for the movement of said hanger support, and bearing portions carried by said hanger support adapted to be moved into rigid engagement with said frame member after a predetermined vertical movement of said hanger support.

12. In a brake beam suspension for a railway car truck comprising a truck frame member, a hanger support mounted in a vertically extending opening in said frame member for vertical movement relative thereto, said hanger support including a bolt portion extending above said frame member opening and a yoke portion disposed beneath said frame member opening, a coil spring disposed between said frame member and the bolt portion of said hanger member to resiliently support said hanger support on said frame member, a pin pivotally connecting a hanger link member to the yoke portion of said hanger support, vertically directed bolt bores extending through said yoke portion, bolts connected to said frame member through said bolt bores so as to slidably mount said hanger support on said frame member and provide guide means for the movement of said hanger support, said bolts being arranged to retain said pivot pin in assembled position, and bearing portions carried by said hanger support adapted to be moved into rigid engagement with said frame member after a predetermined vertical movement of said hanger support.

13. A brake beam suspension adapted to be mounted on a frame member comprising a hanger support provided with a bolt portion and a depending yoke portion, a coil spring surrounding said bolt portion to resiliently mount the hanger support on the frame member, a hanger link pivotally connected to the hanger support yoke portion and bolts slidably mounted in said yoke portion adapted to be connected to the frame member to mount the suspension on the frame member and to provide guide means for the movement of the resiliently mounted hanger support, said support including anchor portions adapted to be engaged with said frame member after a predetermined movement of said support to rigidly connect said support to the associated frame member.

14. A brake beam suspension adapted to be mounted on a frame member comprising a hanger support provided with a bolt portion and a depending yoke portion, a coil spring surrounding said bolt portion to resiliently mount the hanger support on the frame member, spring loaded friction shoes engaged with said bolt portion to damp the vibration of said hanger support, a hanger link pivotally connected to the hanger support yoke portion and bolts slidably mounted in said yoke portion adapted to be connected to the frame member to mount the suspension on the frame member and to provide guide means for the movement of the resiliently mounted hanger support, said support including anchor portions adapted to be engaged with said frame of said support to rigidly connect said support to the associated frame member.

15. A brake beam suspension adapted to be mounted on a frame member comprising a hanger support, a coil spring connected to a portion of said hanger support and adapted to extend between the frame member and the hanger support to resiliently mount the hanger support on the frame member, a hanger link pivotally connected to the hanger support, and bolts slidably mounted in said hanger support adapted to be connected to the frame member to mount the suspension on the frame member and provide guide means for the movement of the resiliently mounted hanger support, said support including portions adapted to be rigidly engaged with the frame member after a predetermined movement of the support.

16. A brake beam suspension adapted to be mounted on a frame member comprising a hanger support, a coil spring connected to a portion of said hanger support and adapted to extend between the frame member and the hanger support to resiliently mount the hanger support on the frame member, vibration damping means associated with said hanger support, a hanger link pivotally connected to the hanger support, and bolts slidably mounted in said hanger support adapted to be connected to the frame member to mount the suspension on the frame member and provide guide means for the movement of the resiliently mounted hanger support, said support incluidng portions adapted to be rigidly engaged with the frame member after a predetermined movement of the support.

17. A brake beam suspension adapted to be mounted on a frame member comprising a hanger support, resilient means adapted to mount said hanger support on the frame member for vertical reciprocation, damping means engaging said support to restrain vibration thereof, bearing portions carried by said support adapted to limit vertical movement of said support and to provide means for rigidly connecting said support to the frame member, guide means to control the vertical movement of the resiliently mounted hanger support, and a hanger link pivotally connected to said support.

18. A brake beam suspension adapted to be mounted on a frame member comprising a hanger support, means adapted to resiliently support said hanger support on the frame member, spring loaded vibration damping means engaging said hanger support to restrain movement thereof, guide means to control movement of the resiliently supported hanger support, and means carried by said hanger support adapted to be moved into engagement with the frame member to rigidly support the hanger support on the frame member.

19. A suspension device for a railway truck brake beam adapted to be mounted on a truck frame member comprising a resilient unit supported by said frame member, a brake beam hanger support carried by said resilient unit in a manner to provide for oscillatory vertical movement of the support relative to said frame member, anchor portions on said hanger support adapted to be engaged with said frame member after predetermined vertical movement of said support, rigid means guiding the vertical movement of said hanger supports, friction means to damp vertical vibration of said support, and means for pivotally connecting a hanger member to said support.

PERCY BEST.

REFERENCES CITED

The following references are of record in the file of this patent:

UNITED STATES PATENTS

| Number | Name | Date |
| --- | --- | --- |
| 683,576 | Ritter | Oct. 1, 1901 |
| 1,035,913 | Schoen | Aug. 20, 1912 |
| 1,199,937 | Smalley | Oct. 3, 1916 |
| 2,360,478 | Dath | Oct. 17, 1944 |
| 2,403,583 | Dath | July 9, 1946 |
| 2,460,248 | Baselt | Jan. 25, 1949 |